J. C. McMULLIN.
Signal-Lanterns.

No. 149,942.      Patented April 21, 1874.

WITNESSES.
E. Wolff
O. Sedgwick

INVENTOR.
J. C. McMullin
BY
ATTORNEYS.

UNITED STATES PATENT OFFICE.

JAMES C. McMULLIN, OF CHICAGO, ASSIGNOR TO HIMSELF AND WILLIAM H. MASTERMAN, AND JOHN ADAMS JACKMAN, JR., OF BLOOMINGTON, ILL.

IMPROVEMENT IN SIGNAL-LANTERNS.

Specification forming part of Letters Patent No. 149,942, dated April 21, 1874; application filed December 1, 1873.

*To all whom it may concern:*

Be it known that I, JAMES C. McMULLIN, of the city of Chicago, in the county of Cook and State of Illinois, have invented a new and useful Improvement in Signal-Lights, of which the following is a specification:

My invention relates to improvement in the signal-lights of locomotives, railroad cars and stations, vessels, docks, light-houses, and other objects, by which the light is thrown out in such a manner that portions of it are seen at greater, and other portions at lesser, distances, permitting, thereby, the approximate determination of the distance of the lights from the points of observation, and avoiding, to some extent, the danger of collisions or other accidents.

My invention consists, mainly, in the construction of the front part of the signal-light with a number of lenses of different sizes, arranged with or without colored glasses, or the arrangement of the front part with suitable designs of colored glasses, so that a similar graduation in the intensity of the emitted light is produced.

Figure 1:
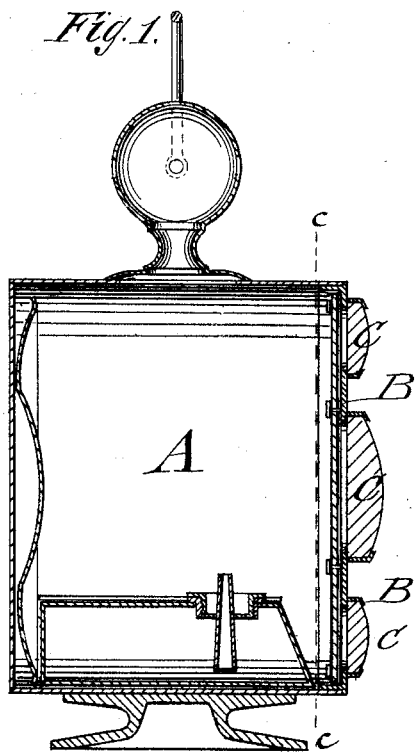
Figure 2:
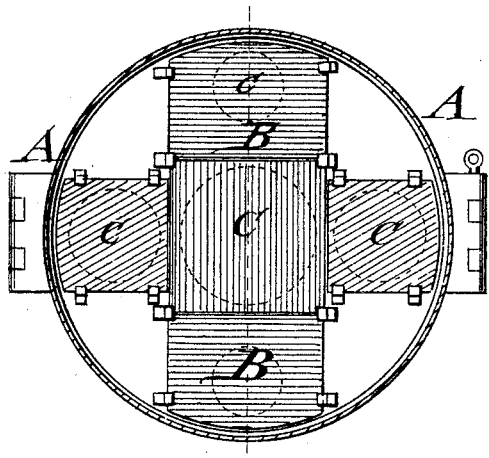

In the accompanying drawing, Figure 1 represents a vertical axial section of my improved signal-light, and Fig. 2 a vertical transverse section of the same on the line c c, Fig. 1, showing inside view of the front part of the same.

Similar letters of reference indicate corresponding parts.

A in the drawing represents a lantern or lamp, of any approved construction and material, and provided with one or more burners, as desired. The front part B of the same is constructed with a series of lenses, C, of varying size, arranged, by preference, with a central one of larger diameter, side lenses of medium, and top and bottom lenses of smaller diameter, as indicated in the drawing.

Any other arrangement as to number, size, or form of lenses may be made, and the same be provided with or without glasses of different colors, as may be desirable, for the purposes for which the signal-light is intended.

In place of the lenses any other equivalent construction of the front part may be used, as, for instance, designs of different-colored glass in star, diagonal, or other shapes, provided that the front part emits the light of the burner in such a manner that portions thereof are emitted so as to be visible at greater distance, while other portions are only discernible at nearer distances on approaching gradually toward the light.

When, therefore, a lantern for a train or pier is arranged with a larger lens having a red-colored glass, smaller lenses with yellow glass, and still smaller lenses with blue glass, in suitable position toward the same, it is obvious that the engineer or pilot will discover at a certain distance the light which issues from the larger lens, and gradually, on approaching, observe the light from the smaller lenses, so that he is enabled thereby to determine, in connection with previous tests and experience, the distance of his point of observation from the light. It furnishes him, therefore, with a means to define, with considerable accuracy, the position of his train or vessel toward the light observed, and give him, thereby, either warning of danger or increased confidence in following his course.

When designs of colored glass are used, the effect will be similar to that of the lenses, as the more transparent parts of the glass offer less resistance to the passage of the light, and send a portion of the same to a greater distance as those parts of the glass front, which, being less transparent, absorb the rays of the light in greater or less degree. The distance of the signal-light from the point from which it is observed may, in this way, be determined by the succession of different colors as they become visible to the eye. The practical use of the signal-lights is thereby enhanced, and the danger of accidents to a great extent prevented.

Having thus described my invention, I claim as new and desire to secure by Letters Patent—

A signal-lantern, provided on its face with transparent glasses varying in their power of transmitting light to a distance, substantially as described.

JAMES C. McMULLIN.

Witnesses:
J. B. CONYER,
SAML. L. WHIPPLE.